United States Patent [19]

French

[11] 4,398,840

[45] Aug. 16, 1983

[54] FRAME CONNECTION ASSEMBLY FOR A FENCE GATE

[76] Inventor: Errol J. French, P. O. Box 1314, Chattanooga, Tenn. 37401

[21] Appl. No.: 221,010

[22] Filed: Dec. 29, 1980

[51] Int. Cl.$^3$ .......................... F16C 11/00; F16D 1/12

[52] U.S. Cl. .......................................... 403/98; 256/73; 256/67

[58] Field of Search ....................... 403/98, 92; 256/67, 256/65, 73, 24, 26, 32, 47

[56] References Cited

U.S. PATENT DOCUMENTS

| | | | |
|---|---|---|---|
| 364,171 | 5/1897 | Harrington | 403/98 |
| 550,528 | 11/1895 | Peters | 256/67 X |
| 2,690,326 | 9/1954 | Kranick | 256/35 X |
| 4,208,038 | 6/1980 | Reid | 256/65 |

FOREIGN PATENT DOCUMENTS

| | | | |
|---|---|---|---|
| 219880 | of 1959 | Australia | 256/26 |
| 15651 | of 1885 | United Kingdom | 403/98 |

*Primary Examiner*—Andrew V. Kundrat

*Attorney, Agent, or Firm*—Pitts, Ruderman & Kesterson

[57] ABSTRACT

A frame member connection assembly for a fence gate which enables adjustment of the substantially horizontally disposed frame members such that they extend parallel with the supporting surface and assist in preventing unnecessary gaps between the gate and such supporting surface. The connection assembly includes a mating pair of brackets, each of which have a receptacle for receiving juxtaposed end portions of joined frame members. A connector member is mounted on one end portion of each of the receptacles and is designed for being connected with the mating connector member of the mating bracket for receiving and holding the juxtaposed end portions of the joined gate frame members. The connection assembly supports the frame members in such a manner that their centrally disposed longitudinal axis substantially intersect, to facilitate rotation of the joined frame members with respect to each other to a desired position where they are secured.

7 Claims, 7 Drawing Figures

FRAME CONNECTION ASSEMBLY FOR A FENCE GATE

TECHNICAL FIELD

This invention relates to a fence gate, and more particularly concerns a fence gate connection assembly which enables positioning the frame members of the gate at preselected angles with respect to each other such that gaps between the gate and the supporting surface are minimized.

BACKGROUND ART

The gates for fences circumscribing property are often disposed on a sloped supporting surface such as a hill. Conventially, the gate includes a pair of substantially vertical frame members and a pair of substantially horizontal frame members which are rigidly secured at their juxtaposed end portions forming a rectangular gate. One of the vertical frame members is pivotally mounted on a support post disposed vertically and having one end portion buried in the ground. Inasmuch as the horizontally disposed gate frame members of the rectangular gate do not extend parallel with the supporting surface, normally the ground, in certain applications the outboard end portion of the gate may be disposed from several inches to several feet from the ground even though the end portion of the gate pivotally mounted on the support post may be disposed only a few inches from the ground. This gap defined between the outboard end portion of the gate and the ground for rectangular gates is, of course, dependant on the slope of the ground and the length of the gate structure itself. It will, of course, be recognized that the gap between the gate and the ground may occur at either the outboard end portion of the gate or proximate the supporting post depending on the particular gate structure. The major disadvantage of a substantially rectangular gate disposed on a sloped surface is that a gap will be defined inasmuch as the horizontally disposed frame members of the gate will not extend parallel with the supporting surface such that the gap between the lower edge of the gate and the ground increases proportionally with the ground slope. This gap reduces the security of the property circumscribed by the gate inasmuch as animals and/or persons may be able to crawl through the gap between the gate and the ground to enter the protected property.

Accordingly, it is an object of the present invention to provide a frame member connection assembly for a fence gate which enables adjusting the horizontally disposed gate fame member such that they extend substantially parallel with a sloped supporting surface. Another object of the invention is to provide an improved frame member connection assembly which is inexpensive to manufacture and which can readily be assembled to reduce the cost of gate fabrication. Yet another object of the invention is to provide a frame member connection assembly which can readily position the substantially horizontally disposed gate frame members along an axis parallel with the slope of the supporting surface. Still a further object of the invention is to provide a frame member connection assembly for a fence gate which positions the axes of the juxtaposed end portions of the frame members connected thereby such that the frame members readily pivot with respect to each other for positioning the frame members in conformity with the slope of the ground to eliminate excess gaps between the gate and the supporting surface or ground. Other objects and advantages of the assembly will become apparent upon reading the detailed description together with the drawings described as follows.

DISCLOSURE OF THE INVENTION

In accordance with various features of the invention, a frame member connection assembly for a fence gate having a pair of substantially horizontally disposed frame members and a pair of substantially vertically disposed frame members is provided. The connection assembly enables positioning the substantially horizontally disposed gate frame members along an axis substantially parallel with the supporting surface regardless of whether the supporting surface is horizontal or sloped. The connection assembly includes a pair of mating brackets and each having a receptacle with a side wall and an end wall. The receptacle has a preselected shape to receive the end portions of the frame members joined through the connection assembly. Each of the receptacles carries a connector member defining an opening therethrough which receives securing means such that the brackets can be readily assembled and disassembled during the gate construction. Preferably, the connector members are offset from the central longitudinal axis of the bracket such that the longitudinal axis of the frame members joined through the connection assembly rotate about their central longitudinal axis. In this manner, the gate frame assembly becomes a parallelogram and can adjust to accomodate various sloping supporting surfaces.

BEST MODE FOR CARRYING OUT THE INVENTION

Figures 1, 5, 6:
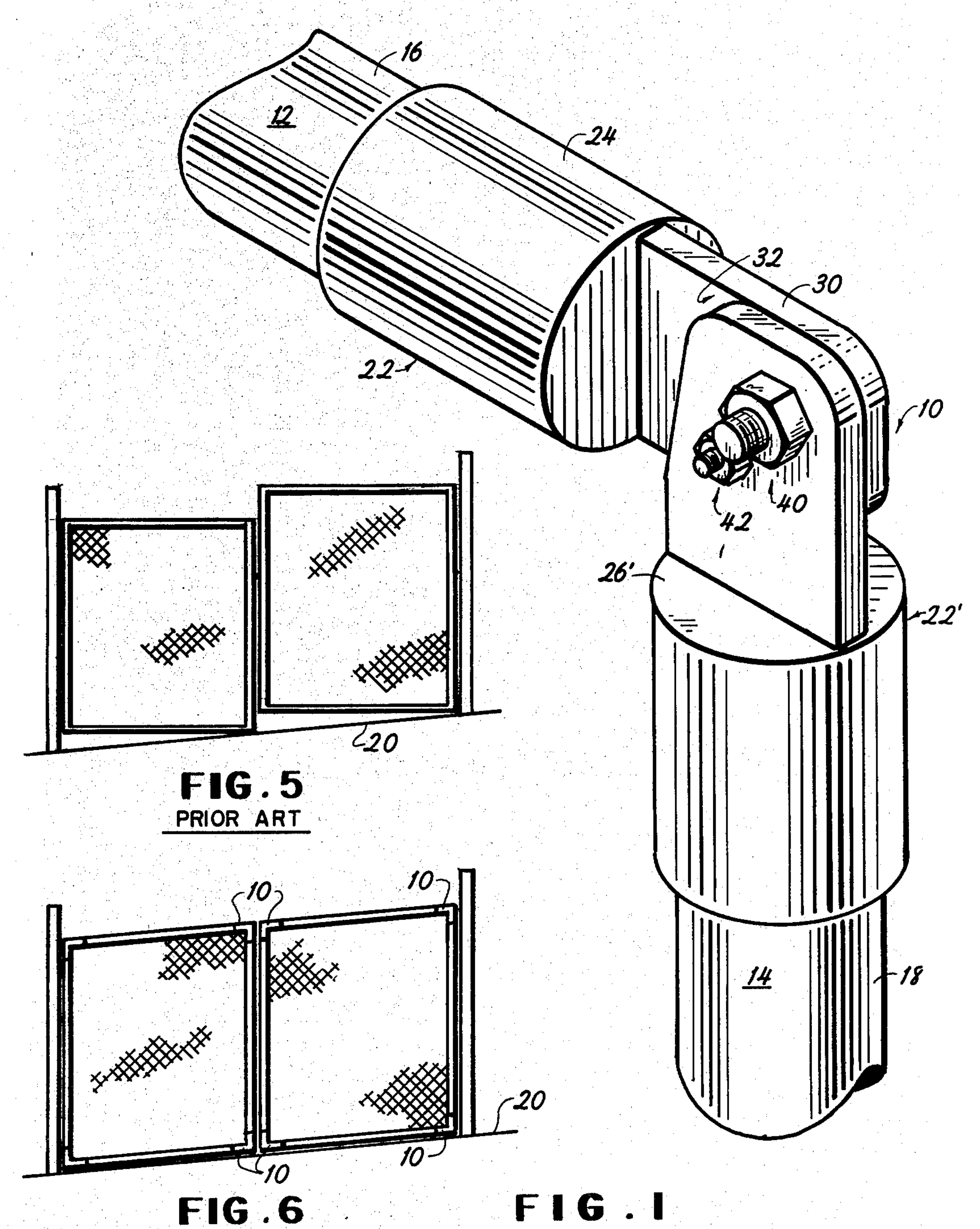
FIG. 5 PRIOR ART
FIG. 1 is a perspective view of a frame member connection assembly constructed in accordance with various features of the invention and which includes bracket receptacles designed for receiving the juxtaposed end portions of the gate frame members which are partially broken away.
FIG. 5 illustrates a conventional gate mounted on a sloped surface and depicts the gap defined between the gate and the supporting surface where the gate is rectangular.
FIG. 6 illustrates a gate incorporating frame member connection assemblies constructed in accordance with the various features of the present invention which enable positioning the substantially horizontally disposed gate frame members along an axis substantially parallel with the supporting surface thereby reducing the gap between the gate and the supporting surface to enhance the security of the property circumscribed by the fence and gate.

Referring now to the drawings, a frame member connection assembly for a fence gate constructed in accordance with various features of the invention is generally indicated at 10 in FIG. 1. This connection assembly is particularly suitable for a fence gate having a pair of substantially horizontally disposed frame members, one of such frame members being indicated at 12, and a pair of substantially vertically disposed frame members, one of said vertically disposed frame members being indicated generally at 14. Each of the horizontally disposed frame members and each of the vertically disposed frame members have opposite end portions and the juxtaposed end portions of one of the horizontally disposed frame members and one of the vertically disposed frame members are joined at each of the corners of the gate. For example in FIG. 1, the end portion 16 of the horizontally disposed frame member 12 is joined as will be more particularly described hereinafter, with the end portion 18 of the substantially vertically disposed frame member 14.

In prior art fence gates, the frame member connection assembly for each of the corners of the gates is generally rigid such that the gate or gate sections comprising the overall gate, are rectangular in outline. This prior art construction apparatus is illustrated in FIG. 5. While such gate construction methods are satisfactory for flat surfaces, when a gate, of the type illustrated in FIG. 5 which has a rigid corner and perpendicular connector sections, that is, corner connectors with legs disposed at right angles with each other, is utilized on a sloping supporting surface 20, the substantially horizontally disposed gate frame members form an angle with this supporting surface which forms gaps between the fence gate and the supporting surface. These gaps may be substantially eliminated as is illustrated in FIG. 6 by constructing the fence gate such that the substantially horizontally disposed gate frame members extend substantially parallel with the supporting surface. To this end, the frame member connection assembly for a fence gate constructed in accordance with various features of the present invention, disposes the juxtaposed end portions of the gate fame members such that they form a preselected angle whereby the substantially horizontally disposed gate frame members are positioned substantially parallel with respect to the supporting surface.

One such frame member connection assembly is illustrated in FIG. 1. This connection assembly is preferably fabricated from a rigid material. Each corner frame connection assembly includes a first bracket 20 that defines a receptacle 24 having a side wall and an end wall 26. The cross-sectional outline of the receptacle is preselected for receiving one end portion of the gate frame members. In the illustrated embodiment, receptacle 24 is cylindrical in configuration and defines a circular cross-sectional outline for receiving the cylindrical end portion 16 of the frame member 12. While in the illustrated embodiment, the receptacle is cylindrical, various other configurations may be utilized to conform the receptacle to the shape of the end portion of a frame member received thereby.

Figure 2:
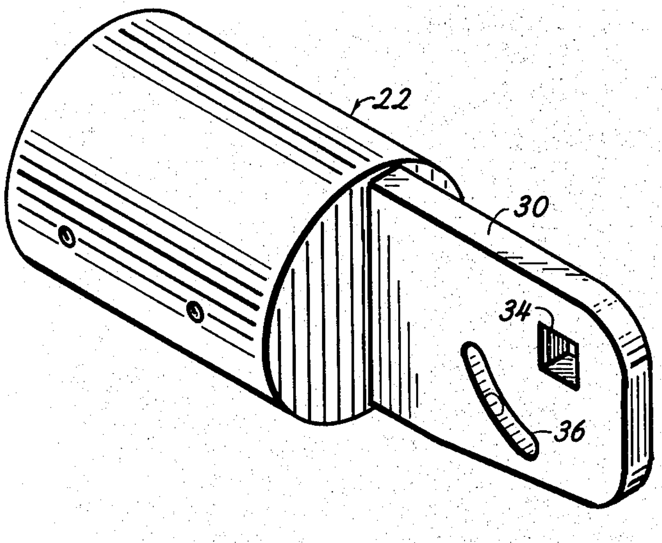
FIG. 2 is a perspective view of one embodiment of the connection assembly bracket having a connector member opening which is arcuate to enable positively positioning mating brckets at a preselected angular position.
Figure 2A:
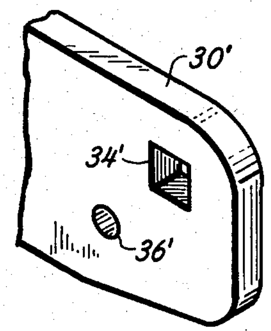
FIG. 2A illustrates a further embodiment of a bracket connector member.

A connector member generally indicated at 30 includes a first end portion which is secured to the end wall 26 of the receptacle at a preselected location. This connector member 30 is preferably fabricated from a rigid material such as aluminum, steel, or the like, and is substantially planar. The end portion of the connector member which is secured to the end wall 26 is approximately equal in width to the diameter of the receptacle such that it does not overhang the receptacle wall. Preferably, this connector member is secured to the end wall 26 at a location offset from the longitudinal axis of the receptacle such that the face 32 of the connector member is disposed substantially along the central longitudinal axis of the receptacle. The reason for this offset mounting will become more apparent hereinafter. As illustrated in FIGS. 2 and 2A, the opposite end portion of the connector member 30 defines an opening 34 therethrough. In one embodiment, a further opening 36 offset from the opening 34 is defined in the end portion of the connector member. As illustrated in FIG. 2 the opening 36 is arcuate. Alternatively, this opening 36 may be circular as indicated in FIG. 2A.

Figure 3:
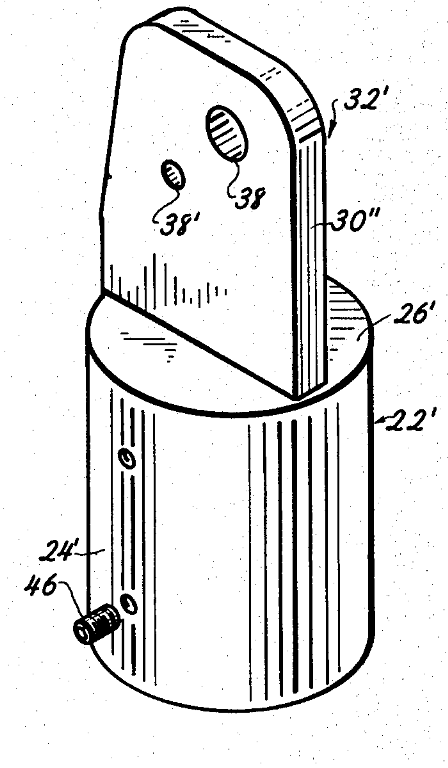
FIG. 3 illustrates a connection assembly bracket which is designed for mating with the connection assembly bracket in FIG. 2.

A mating bracket 22' illustrated in FIGS. 1 and 3 is substantially identical to the bracket 22 illustrated in FIGS. 1 and 2. More specifically, this bracket 22' defines a receptacle 24' having a side wall and an end wall 26' which closes one end portion of the receptacle 24'. A connector member 30'' includes an end portion which is secured to the end wall 26' of the receptacle at a preselected location. In the illustrated embodiment the connector members 30 and 30'' extend substantially perpendicularly from the end walls 26 and 26', respectively.

The opposite end portions of the connector member 30'' includes an opening 38 and an opening 38' which extends through the connector member. The opening 38 is disposed at a preselected position on the connector member 30'' such that it aligns with the opening 34 on the bracket 22 when the brackets 22 and 22' are placed in mating relationship.

Figure 4:
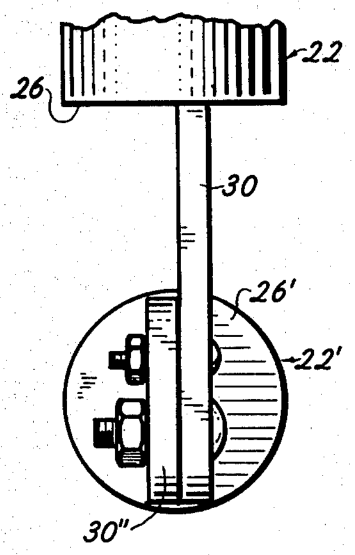
FIG. 4 illustrates a plan view of the connection assembly illustrated in FIG. 1 and depicts the offset mounting of the connector members on their respective receptacles such that the axis of the gate frame members substantially intersect in the interfacing planes of the joined connector members.

Securing means joint the connector member 30 and the connector member 30', and in the embodiment illustrated in FIGS. 1 and 4 the securing means comprises a nut and bolt as indicated generally at 40. The securing means serves as a pivot axis for rotation of the mating brackets, to a desired position.

It will be recognized that the slope of the ground over which the gate incorporating the frame member connection assembly of the present invention is mounted will vary. Accordingly, it is necessary to positively position the angle between the central longitudinal axes of the bracket 22 and the bracket 22' with respect to each other. In this connection, means are provided for positively positioning the rotational position of the bracket 22 with respect to the bracket 22' upon joining these members with the securing means 40. In the illustrated embodiment, the securing means comprises a nut and bolt 42 which extend through the mating openings 36 and the opening 38'. More specifically, upon joining the bracket 22 with the bracket 22' by use of the securing means 40, the nut and bolt assembly 42 will extend through the opening 38' and the arcuate opening 36 and the brackets will be rotated about the bolt shaft of the securing means until a preselected angle is formed between these pivotally connected brackets. At that point, positive positioning means 42 will be secured in position such that further rotation of the brackets with respect to each other will be prevented.

In the connector member illustrated in FIG. 2A, the opening 36 is positioned at a preselected location such that the angular relationship between the pivotally connected brackets 20 and 22 will be predetermined by the position of this opening 36'.

As has been mentioned briefly before and as should now be recognized, the offset mounting of the connector members 30 and 30'' on their respective brackets, positions the surface 32 and 32' of the connector members at a location such that these surfaces lie substantially along the central longitudinal axis of the bracket which is an extended central longitudinal axis of the frame member carried by the brackets. In this connection, the pivoting of the brackets with respect to each other is facilitated, such that they can readily rotate to a desired position where they are secured.

As illustrated in FIGS. 2 and 3, the openings are provided in one embodiment of the connection assembly for receiving means such as the set screw 46 (see FIG. 3) which serves to secure the side wall of this receptacle with the end portion of the frame member received therein. Other arrangements for joining the brackets and the end portion of the gate frame members received therein can be utilized.

From the foregoing detailed description, it will be recognized by those skilled in the art that a frame member connection assembly for a fence gate having certain advantages over the prior art, has been described and illustrated, More particularly, the frame member connection assembly is designed for inexpensive manufacture and can be readily assembled and adjusted such that the substantially horizontally disposed frame members (cross members) of a conventional gate are disposed along axes which are substantially parallel with the supporting surface or ground of the property circumscribed by the fence. In this connection, the mating brackets are designed to be joined for easy rotation and means are provided for securing the relative rotational position of one bracket with respect to the other such that a preselected disposition of the substantially horizontally extending frame members can be secured.

While a preferred embodiment has been shown and described, it will be understood that there is no intent to limit the invention by such disclosure, but rather it is intended to cover all modifications and alternate constructions falling within the spirit and scope of the invention as defined in the appended claims.

I claim:

1. A frame member connection assembly for a fence gate having a pair of substantially horizontally disposed frame members each of said horizontally disposed frame members having opposite end portions, and a pair of substantially vertically disposed frame members each of said vertically disposed frame members having opposite end portions, said frame member connection assembly comprising:

a first bracket including a receptacle having a sidewall and an endwall for receiving said end of said frame members, and a connector member having a first end, a further end, and a planar mating surface extending between said first and further ends, said first end attached to said endwall of said receptacle at a selected position whereby said mating surface extends along an extension of an axis of said receptacle, said connector member being provided with a first and a further opening therethrough substantially perpendicular to said mating surface, said first opening positioned at a first selected location toward said first end of said connector member on one side of said extension of said axis of said receptacle, and said further opening positioned at a second selected location toward said further end of said connector member on an opposite side of said extension of said axis of said receptacle;

a further bracket including a receptacle having a side wall and an end wall for receiving said end of said frame members, and a connector member having a first end, a further end and a planar mating surface extending between said first and further end, said first end attached to said end wal of said receptacle at a selected position whereby said mating surface extends along an extension of an axis of said receptacle, said connector member being provided with a first and a further opening therethrough substantially perpendicular to said mating surface, said first opening positioned at a first selected location toward said first end of said connector member on one side of said extention of said axis of said receptacle and said further opening positioned at a second selected location toward said further end of said connector member on an opposite side of said extension of said axis of said receptacle, said first and said further openings of said further bracket being symmetrically positioned with respect to said first and said further openings of said first bracket;

first securing means passing through said first openings of said first and said further brackets; and further securing means passing through said further openings of said first and said further brackets.

2. The frame member connection assembly of claim 1 wherein at least one of said first openings in said first and further brackets is arcuate along a circle circumscribed about said further opening, whereby the angular orientation of said first bracket can be adjusted with respect to said further bracket for angularly adjusting the orientation between axes of said horizontal and vertical frame members of said gate for positioning said horizontal frame members substantially parallel with the ground beneath said fence gate.

3. The frame member connection assembly of claim 1 further comprising means for securing said side walls of said receptacles to ends of said vertical and horizontal frame members of said gate.

4. The frame member connection assembly of claim 2 wherein said first and said further securing means comprise releasable threaded fasteners passing through said first and said further openings whereby said mating surfaces can be non-rotatably positioned with respect to each other after adjustment of said orientation between axes of said horizontal and vertical frame members of said gate.

5. The frame member connection assembly of claim 1 wherein said first end of said connector members of said first and further brackets extends substantially across said end walls of said receptacles.

6. The frame member connection assembly of claim 1 wherein said receptacles of said first and further brackets are circular in cross-section.

7. The frame member connection assembly of claim 1 wherein said receptacle and said connecting members are formed integrally.

* * * * *